United States Patent
Ito

(10) Patent No.: US 8,814,960 B2
(45) Date of Patent: Aug. 26, 2014

(54) METHOD FOR PRODUCING LIQUEFIED MATERIAL FROM GLYCERIN-BASED SOLID MATERIAL

(75) Inventor: Tomoaki Ito, Osaka (JP)

(73) Assignees: Tomoaki Ito, Osaka (JP); Oneworld Corporation, Osaka (JP); Greenlife Techno Co., Ltd., Tokyo (JP)

( * ) Notice: Subject to any disclaimer, the term of this patent is extended or adjusted under 35 U.S.C. 154(b) by 374 days.

(21) Appl. No.: 13/393,368

(22) PCT Filed: Aug. 30, 2010

(86) PCT No.: PCT/JP2010/064673
§ 371 (c)(1),
(2), (4) Date: Apr. 5, 2012

(87) PCT Pub. No.: WO2011/024989
PCT Pub. Date: Mar. 3, 2011

(65) Prior Publication Data
US 2012/0186145 A1 Jul. 26, 2012

(30) Foreign Application Priority Data

Aug. 31, 2009 (JP) ................. 2009-199944

(51) Int. Cl.
*C10L 1/18* (2006.01)
*C10L 1/02* (2006.01)
*C10G 1/00* (2006.01)

(52) U.S. Cl.
CPC ......... *C10L 1/026* (2013.01); *C10G 2300/1051* (2013.01); *C10G 2300/80* (2013.01); *Y02E 20/13* (2013.01); *C10G 1/00* (2013.01); *C10G 2300/1014* (2013.01); *C10G 2300/1018* (2013.01); *C10G 2400/04* (2013.01)
USPC .............................................. 44/445; 44/307

(58) Field of Classification Search
CPC ................ C10L 1/026; C10L 2300/80; C10L 2300/1014; C10L 2300/1018; C10L 2400/04; Y02E 50/13
USPC ............................................ 44/451, 307, 445
See application file for complete search history.

(56) References Cited

U.S. PATENT DOCUMENTS

| 2,194,894 | A | * | 3/1940 | Ellis ........................... 528/295.5 |
| 8,455,699 | B2 | * | 6/2013 | Hatcher et al. ................ 568/679 |
| 8,648,219 | B2 | * | 2/2014 | Cramer ......................... 568/869 |
| 2007/0277430 | A1 | | 12/2007 | Jackman et al. |

FOREIGN PATENT DOCUMENTS

| JP | 2004-156836 | 6/2004 |
| JP | 2005-060587 | 3/2005 |
| JP | 2006-348189 | 12/2006 |
| JP | 2008-111098 | 5/2008 |
| WO | WO-2006/129435 | 12/2006 |

OTHER PUBLICATIONS

Marta Paniagua et al., Energy and Fuel, 2007 vol. 21, No. 3, p. 1782-1791.

* cited by examiner

*Primary Examiner* — Cephia D Toomer
(74) *Attorney, Agent, or Firm* — Jordan and Hamburg LLP

(57) ABSTRACT

For producing a liquefied material from a glycerin-based solid material, a glycerin-based solid material is allowed to be efficiently liquefied to produce a liquefied material that can be used as, for example, a fuel or the like. A glycerin-based solid material, such as a glycerin-based solid material produced as a byproduct in the production of a biodiesel fuel from a plant oil, is mixed with at least one oil selected from the group consisting of a mineral oil, an animal oil, and a plant oil; and an acid to produce a liquefied material, the acid being mixed in such that the pH of the liquefied material is 3 to 12.

30 Claims, No Drawings

METHOD FOR PRODUCING LIQUEFIED MATERIAL FROM GLYCERIN-BASED SOLID MATERIAL

BACKGROUND OF THE INVENTION

The present invention relates to a method for liquefying a glycerin-based solid material and producing a liquefied material.

Biodiesel fuel (BDF) is obtained for use from an esterification reaction in which an alcohol and sodium hydroxide are added to Jatropha oil, sunflower oil, rapeseed oil, olive oil, or another plant oil. Glycerin is also generated in the meanwhile, as a byproduct (secondary product) together with the biodiesel fuel (see Patent Document 1). Since the glycerin byproduct remaining after the BDF has been separated from the product has BDF, ethanol, sodium hydroxide, and other substances mixed therewith; and is a solid at normal temperatures, it gets discarded as a waste product, there being no applications therefor.

PRIOR ART DOCUMENTS

Patent Document 1: Japanese Laid-open Patent Publication 2006-348191

However, because of the fact that the glycerin byproduct has been discarded as a waste product, it is impossible to fully meet the societal requirements of environmental conservation and the efficient use of resources.

The present invention has been contrived in view of the technical background above, it being an objective thereof to provide a method for producing a liquefied material from a glycerin-based solid material, whereby it is possible to efficiently liquefy a glycerin-based solid material to produce a liquefied material that can be used as, for example, a fuel or the like.

SUMMARY OF THE INVENTION

To achieve the aforesaid objective, the present invention provides the following means.

According to a first aspect, the present invention provides a method for producing a liquefied material from a glycerin-based solid material, characterized in that a liquefied material is produced by mixing: a glycerin-based solid material containing glycerin;

at least one oil selected from the group consisting of a mineral oil, an animal oil, and a plant oil;

and an acid; the acid being mixed in such that the pH of the liquefied material is 3 to 12.

According to a second aspect, the present invention provides a method for producing a liquefied material from a glycerin-based solid material, characterized in that a liquefied material is produced by mixing: a glycerin-based solid material formed as a byproduct when a biodiesel fuel is produced from a plant oil;

at least one oil selected from the group consisting of a mineral oil, an animal oil, and a plant oil;

and an acid; the acid being mixed in such that the pH of the liquefied material is 3 to 12.

According to a third aspect, the present invention provides the method for producing a liquefied material from a glycerin-based solid material according to the first or second aspect, wherein when the components are mixed, a mixture formed by mixing the oil and the acid is mixed with the glycerin-based solid material.

According to a fourth aspect, the present invention provides the method for producing a liquefied material from a glycerin-based solid material according to any of the first to third aspects, characterized in that when the components are to be mixed, mixing is performed such that the glycerin-based solid material content relative to the total volume of glycerin-based solid material and oil is 50 vol % to 90 vol %, and 2 to 10 parts by volume of the acid is mixed per 100 parts by volume of the total of the glycerin-based solid material and oil.

According to a fifth aspect, the present invention provides a method for producing a liquefied material from a glycerin-based solid material, characterized in that a liquefied material is produced by mixing a glycerin-based solid material containing glycerin with an acid; the acid being mixed in such that the pH of the liquefied material is 3 to 12.

According to a sixth aspect, the present invention provides the method for producing a liquefied material from a glycerin-based solid material according to any of the first to fifth aspects, wherein an inorganic acid is used as the acid.

According to a seventh aspect, the present invention provides the method for producing a liquefied material from a glycerin-based solid material according to the sixth aspect, wherein the inorganic acid is hydrochloric acid.

According to an eighth aspect, the present invention provides a method for producing a liquefied material from a glycerin-based solid material, characterized in that a liquefied material is produced by mixing: a glycerin-based solid material containing glycerin;

an oxidant;

and at least one oil selected from the group consisting of a mineral oil, an animal oil, and a plant oil; the oxidant being mixed in such that the pH of the liquefied material is 3 to 12.

According to a ninth aspect, the present invention provides a method for producing a liquefied material from a glycerin-based solid material, characterized in that a liquefied material is produced by mixing: a glycerin-based solid material formed as a byproduct when a biodiesel fuel is produced from a plant oil;

an oxidant;

and at least one oil selected from the group consisting of a mineral oil, an animal oil, and a plant oil; the oxidant being mixed in such that the pH of the liquefied material is 3 to 12.

According to a tenth aspect, the present invention provides the method for producing a liquefied material from a glycerin-based solid material according to the eighth or ninth aspect, wherein when the components are to be mixed, the glycerin-based solid material and the oxidant are mixed first, and the oil is mixed in thereafter.

According to an eleventh aspect, the present invention provides the method for producing a liquefied material from a glycerin-based solid material according to any of the eighth to tenth aspects, characterized in that when the components are to be mixed, 0.1 to 40 parts by volume of the oil and 0.1 to 20 parts by volume of the oxidant, in terms of an oxidant solution having a concentration of 35 mass %, are mixed per 100 parts by volume of the glycerin-based solid material.

According to a twelfth aspect, the present invention provides a method for producing a liquefied material from a glycerin-based solid material, characterized in that a liquefied material is produced by mixing a glycerin-based solid material containing glycerin with an oxidant; the oxidant being mixed in such that the pH of the liquefied material is 3 to 12.

According to a thirteenth aspect, the present invention provides the method for producing a liquefied material from a glycerin-based solid material according to any of the eighth to twelfth aspects, wherein hydrogen peroxide is used as the oxidant.

According to a fourteenth aspect, the present invention provides a method for producing a liquefied material from a glycerin-based solid material, characterized in that a liquefied material is produced by mixing: a glycerin-based solid material containing glycerin;

an oxidant;

at least one oil selected from the group consisting of a mineral oil, an animal oil, and a plant oil;

and an acid; the acid being mixed in such that the pH of the liquefied material is 3 to 12.

According to a fifteenth aspect, the present invention provides a method for producing a liquefied material from a glycerin-based solid material, characterized in that a liquefied material is produced by mixing: a glycerin-based solid material formed as a byproduct when a biodiesel fuel is produced from a plant oil;

an oxidant;

at least one oil selected from the group consisting of a mineral oil, an animal oil, and a plant oil;

and an acid; the acid being mixed in such that the pH of the liquefied material is 3 to 12.

According to a sixteenth aspect, the present invention provides the method for producing a liquefied material from a glycerin-based solid material according to the fourteenth or fifteenth aspect, wherein when the components are to be mixed, the glycerin-based solid material and the oxidant are mixed first, whereupon the oil is then mixed in, after which the acid is mixed in.

According to a seventeenth aspect, the present invention provides the method for producing a liquefied material from a glycerin-based solid material according to any of the fourteenth to sixteenth aspects, characterized in that when the components are to be mixed, 0.1 to 40 parts by volume of the oil, 0.1 to 10 parts by volume of the acid, and 0.1 to 20 parts by volume of the oxidant, in terms of an oxidant solution having a concentration of 5 mass %, per 100 parts by volume of the glycerin-based solid material.

According to an eighteenth aspect, the present invention provides a method for producing a liquefied material from a glycerin-based solid material, characterized in that a liquefied material is produced by mixing: a glycerin-based solid material containing glycerin, an oxidant, and an acid; the acid being mixed in such that the pH of the liquefied material is 3 to 12.

According to a nineteenth aspect, the present invention provides the method for producing a liquefied material from a glycerin-based solid material according to any of the fourteenth to eighteenth aspects, wherein hydrogen peroxide is used as the oxidant.

According to a twentieth aspect, the present invention provides the method for producing a liquefied material from a glycerin-based solid material according to any of the fourteenth to nineteenth aspects, wherein acetic acid is used as the acid.

According to a twenty-first aspect, the present invention provides the method for producing a liquefied material from a glycerin-based solid material according to any of the fourteenth to twentieth aspects, wherein the acid is mixed in such that the pH of the liquefied material is 4 to 11.

According to a twenty-second aspect, the present invention provides the method for producing a liquefied material from a glycerin-based solid material according to any of the first to twenty-first aspects, wherein petroleum is used as the oil.

According to a twenty-third aspect, the present invention provides the method for producing a liquefied material from a glycerin-based solid material according to the twenty-second aspect, wherein the petroleum is one, two, or more types of petroleum selected from the group consisting of paraffin, light oil, and heavy oil.

According to a twenty-fourth aspect, the present invention provides the method for producing a liquefied material from a glycerin-based solid material according to the twenty-second aspect, wherein the petroleum is paraffin.

According to a twenty-fifth aspect, the present invention provides the method for producing a liquefied material from a glycerin-based solid material according to any of the first to twenty-fourth aspects, characterized in that the liquefied material obtained by the mixing is cooled to a temperature of 30° C. or lower, a precipitate is subsequently filtered, whereby a filtrate is obtained; and the filtrate is subsequently distilled at a distillation temperature of 150 to 230° C.

According to a twenty-sixth aspect, the present invention provides the method for producing a liquefied material from a glycerin-based solid material according to any of the first to twenty-fourth aspects, characterized in that the liquefied material obtained by the mixing is cooled to a temperature of 30° C. or lower, a precipitate is subsequently filtered, whereby a filtrate is obtained, the filtrate is cooled to a temperature of 5° C. or lower; a supernatant is obtained from the cooled liquid; and the supernatant is subsequently distilled at a distillation temperature of 150° C. to 230° C.

According to a twenty-seventh aspect, the present invention provides a method for producing a liquefied material, characterized in that a liquid glycerin-based substance containing glycerin is mixed with an acid, thereby producing a liquefied material having a solidifying point that is lower than the solidifying point of the liquid glycerin-based substance; the acid being mixed in such that the pH of the liquefied material is 3 to 12.

According to a twenty-eighth aspect, the present invention provides a method for producing a liquefied material, characterized in that a liquid glycerin-based substance containing glycerin is mixed with an oxidant, thereby producing a liquefied material having a solidifying point that is lower than the solidifying point of the liquid glycerin-based substance; the oxidant being mixed in such that the pH of the liquefied material is 3 to 12.

According to a twenty-ninth aspect, the present invention provides a method for producing a liquefied material, characterized in that a liquid glycerin-based substance containing glycerin is mixed with an acid and an oxidant, thereby producing a liquefied material having a solidifying point that is lower than the solidifying point of the liquid glycerin-based substance; the acid being mixed in such that the pH of the liquefied material is 3 to 12.

According to a thirtieth aspect, the present invention provides a liquefied material for fuel produced by the production method according to any of the first to twenty-ninth aspects.

In the first aspect, a glycerin-based solid material containing glycerin (inclusive of a solid material consisting only of glycerin); at least one type of oil selected from the group consisting of a mineral oil, an animal oil, and a plant oil; and an acid are mixed, and it is therefore possible to liquefy the solid material, i.e., obtain a liquefied material. Further, the acid is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the second aspect, a glycerin-based solid material formed as a byproduct when a biodiesel fuel is produced from a plant oil; at least one type of oil selected from the group consisting of a mineral oil, an animal oil, and a plant oil; and an acid are mixed, and it is therefore possible to liquefy the solid material, i.e., obtain a liquefied material. Further, the acid is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful. Also, since the raw glycerin-based solid material, which is formed as a byproduct when a biodiesel fuel is produced from a plant oil, is being used effectively, the effective use of resources can be promoted.

In the third aspect, since the mixing involves mixing the glycerin-based solid material with a mixture formed by pre-mixing the oil and the acid, efficient liquefaction is possible.

In the fourth aspect, the act of mixing involves mixing such that the glycerin-based solid material content reaches 50 vol % to 90 vol % relative to the total volume of glycerin-based solid material and oil, and also involves mixing 2 to 10 parts by volume of acid per 100 parts by volume of the total of the glycerin-based solid material and oil; therefore, adequate liquefaction is possible even while a high proportion of glycerin is being used.

In the fifth aspect, a glycerin-based solid material containing glycerin is mixed with an acid, and it is therefore possible to liquefy the solid material, i.e., obtain a liquefied material. Further, the acid is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the sixth aspect, since an inorganic acid is used as the acid, it is possible to promote the liquefaction.

In the seventh aspect, since hydrochloric acid is used as the acid, it is possible to further promote the liquefaction.

In the eighth aspect, a glycerin-based solid material containing glycerin (inclusive of a solid material consisting only of glycerin); an oxidant; and at least one type of oil selected from the group consisting of a mineral oil, an animal oil, and a plant oil; are mixed, and it is therefore possible to liquefy the solid material, i.e., obtain a liquefied material. Further, the oxidant is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the ninth aspect, a glycerin-based solid material formed as a byproduct when a biodiesel fuel is produced from a plant oil; an oxidant; and at least one type of oil selected from the group consisting of a mineral oil, an animal oil, and a plant oil; are mixed, and it is therefore possible to liquefy the solid material, i.e., obtain a liquefied material. Further, the oxidant is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful. Also, since the raw glycerin-based solid material, which is formed as a byproduct when a biodiesel fuel is produced from a plant oil, is being used effectively, the effective use of resources can be promoted.

In the tenth aspect, since the mixing involves first mixing the glycerin-based solid material and the oxidant, and later mixing the oil, efficient liquefaction is possible.

In the eleventh aspect, since the mixing involves mixing 0.1 to 40 parts by volume of the oil and 0.1 to 20 parts by volume of the oxidant, in terms of an oxidant solution having a concentration of 35 mass %, per 100 parts by volume of the glycerin-based solid material, adequate liquefaction is possible even while a high proportion of glycerin is being used.

In the twelfth aspect, a glycerin-based solid material containing glycerin is mixed with an oxidant, and it is therefore possible to liquefy the solid material, i.e., obtain a liquefied material. Further, the oxidant is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the thirteenth aspect, since hydrogen peroxide is used as the oxidant, the liquefied material can be obtained at a high yield. That is, a high-calorie liquefied material can be obtained.

In the fourteenth aspect, a glycerin-based solid material containing glycerin (inclusive of a solid material consisting only of glycerin); an oxidant; at least one type of oil selected from the group consisting of a mineral oil, an animal oil, and a plant oil; and an acid are mixed, and it is therefore possible to liquefy the solid material, i.e., obtain a liquefied material. Further, the acid and the oxidant are mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the fifteenth aspect, a glycerin-based solid material formed as a byproduct when a biodiesel fuel is produced from a plant oil; an oxidant; at least one oil selected from the group consisting of a mineral oil, an animal oil, and a plant oil; and an acid are mixed, and it is therefore possible to liquefy the solid material, i.e., obtain a liquefied material. Further, the acid and the oxidant are mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful. Also, since the raw glycerin-based solid material, which is formed as a byproduct when a biodiesel fuel is produced from a plant oil, is being used effectively, the effective use of resources can be promoted.

In the sixteenth aspect, since the mixing involves first mixing the glycerin-based solid material and the oxidant, and later further mixing the oil and thereafter mixing the acid, efficient liquefaction is possible.

In the seventeenth aspect, since the mixing involves mixing 0.1 to 40 parts by volume of the oil, 0.1 to 10 parts by volume of the acid, and 0.1 to 20 parts by volume of the oxidant, in terms of an oxidant solution having a concentration of 5 mass %, per 100 parts by volume of the glycerin-based solid material, adequate liquefaction is possible even while a high proportion of glycerin is being used.

In the eighteenth aspect, a glycerin-based solid material containing glycerin, an oxidant, and an acid are mixed, and it is therefore possible to liquefy the solid material, i.e., obtain a liquefied material. Further, the acid and the oxidant are mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the nineteenth aspect, since hydrogen peroxide is used as the oxidant, the liquefied material can be obtained at a high yield. That is, a high-calorie liquefied material can be obtained.

In the twentieth aspect, since acetic acid is used as the acid, kinematic viscosity can be lowered, which is an advantage.

In the twenty-first aspect, since the acid is mixed in such that the pH of the liquefied material is 4 to 11, the resulting liquefied material has greater long-term stability and maintains a liquid state.

In the twenty-second aspect, since petroleum is used as the oil, the combustion performance of the liquefied material can be further enhanced, because petroleum is favorably combustible.

In the twenty-third aspect, since the petroleum used is one, two, or more types of petroleum selected from the group consisting of kerosene, light oil, and heavy oil, all of which are further favorably combustible, the combustion performance of the liquefied material can be even further enhanced.

In the twenty-fourth aspect, since the petroleum used is kerosene, the combustion performance of the liquefied material can be even further enhanced, and also the amount of residue in the liquefied material can be further lowered, which is an advantage.

In the twenty-fifth aspect, coloring components and other substances in the liquefied material can be eliminated, and a substantially colorless or colorless transparent liquefied material can be produced since the liquefied material obtained by the mixing is cooled to a temperature of 30° C. or lower, a precipitate is filtered to obtain a filtrate, and the filtrate is subsequently distilled at a distillation temperature of 150 to 230° C.

In the twenty-sixth aspect, coloring components and other substances in the liquefied material can be adequately eliminated, and also a substantially colorless or colorless transparent liquefied material can be produced since the liquefied material obtained by the mixing is cooled to a temperature of 30° C. or lower, a precipitate is filtered to obtain a filtrate, the filtrate is subsequently cooled to a temperature of 5° C. or lower, the supernatant is obtained from the cooled liquid, and the supernatant is subsequently distilled at a distillation temperature of 150 to 230° C.

In the twenty-seventh aspect, a liquid glycerin-based substance containing glycerin is mixed with an acid, making it possible to produce a liquefied material having a lower solidifying point than the solidifying point of the liquid glycerin-based substance. For example, a liquefied material having a solidifying point of −30° C. can be produced from a liquid glycerin-based substance having a solidifying point of −5° C. Further, the acid is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the twenty-eighth aspect, a liquid glycerin-based substance containing glycerin is mixed with an oxidant, making it possible produce a liquefied material having a lower solidifying point than the solidifying point of the liquid glycerin-based substance. For example, a liquefied material having a solidifying point of −30° C. can be produced from a liquid glycerin-based substance having a solidifying point of −5° C. Further, the oxidant is mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

In the twenty-ninth aspect, a liquid glycerin-based substance containing glycerin, an acid, and an oxidant are mixed; and it is therefore possible produce a liquefied material having a lower solidifying point than the solidifying point of the liquid glycerin-based substance. For example, a liquefied material having a solidifying point of −30° C. can be produced from a liquid glycerin-based substance having a solidifying point of −5° C. Further, the acid and the oxidant are mixed in such that the pH of the liquefied material is 3 to 12; therefore, the liquefied material will not re-solidify even as time passes, and the liquefied material has long-term stability and maintains a liquid state. The resulting liquefied material has excellent combustion performance and can be used as, for example, a fuel, and is therefore extremely useful.

The thirtieth aspect provides a liquefied material for fuel having excellent combustion performance.

DETAILED DESCRIPTION OF THE PREFERRED EMBODIMENTS

The method for producing a liquefied material from a glycerin-based solid material according to the first group of aspects is characterized in that a liquefied material is produced by mixing: a glycerin-based solid material containing glycerin; at least one oil selected from the group consisting of a mineral oil, an animal oil, and a plant oil; and an acid, the acid being mixed in such that the pH of the liquefied material is 3 to 12.

The method for producing a liquefied material from a glycerin-based solid material according to the second group of aspects is characterized in that a liquefied material is produced by mixing: a glycerin-based solid material containing glycerin; an oxidant; and at least one oil selected from the group consisting of a mineral oil, an animal oil, and a plant oil, the oxidant being mixed in such that the pH of the liquefied material is 3 to 12.

The method for producing a liquefied material from a glycerin-based solid material according to the third group of aspects is characterized in that a liquefied material is produced by mixing: a glycerin-based solid material containing glycerin; an oxidant; at least one oil selected from the group consisting of a mineral oil, an animal oil, and a plant oil; and an acid, the acid being mixed in such that the pH of the liquefied material is 3 to 12.

(Description Relating to the First, Second, and Third Groups of Aspects)

In the first, second, and third groups of aspects, examples of the glycerin-based solid material include a solid material (inclusive of a viscous jelly-like material) consisting only of glycerin or a glycerin-based solid material (inclusive of a viscous jelly-like material) containing glycerin and also containing components other than the glycerin (for example, sodium hydroxide or the like).

Conventionally, a glycerin-based solid material formed as a byproduct (secondary product) when a biodiesel fuel is produced from a plant oil (Jatropha oil, sunflower oil, rapeseed oil, olive oil, and the like) is a solid and is therefore discarded as a waste product, there being no application therefor. However, since it can be efficaciously used when used as the glycerin-based solid material (when it is to be liquefied), resources can be efficaciously used.

Glycerin (alone) exhibits a viscous, jelly-like condition at normal temperatures but will not quite reach a solidified state; however, the glycerin-containing material formed as a byproduct when a biodiesel fuel is produced from the plant oil does reach a solidified state. The production of a biodiesel fuel from a plant oil involves, for example, adding methanol or another alcohol and sodium hydroxide (a catalyst) to a plant oil, and performing esterification, whereby a biodiesel fuel (BDF) is produced. Since, however, residual free fatty acids and sodium hydroxide are believed to be present in the glycerin byproduct remaining after the biodiesel fuel is separated from the product containing the biodiesel fuel, the effect thereof is presumed to contribute to the formation of the solid material. Nevertheless, the reason for the formation of the solid material is unclear at present.

At least one type of oil selected from the group consisting of a mineral oil, an animal oil, and a plant oil is used as the aforesaid oil. Examples of mineral oils include, but are not particularly limited to, petroleum and the like. Examples of animal oils include, but are not particularly limited to, cow oil, pig oil, bird oil, and the like. Examples of plant oils include, but are not particularly limited to, Jatropha oil, sunflower oil, rapeseed oil, olive oil, palm oil, and the like.

Preferably, petroleum is used as the oil. The combustion performance of the liquefied material can be further enhanced, because petroleum is favorably combustible.

Examples of petroleum (including crude oil) include, but are not particularly limited to, paraffin, light oil, heavy oil, gasoline, BDF (biodiesel fuel), kerosene (jet fuel, rocket fuel, and the like) and the like. Preferably, one or more types of petroleum selected from the group consisting of paraffin, light oil, and heavy oil are used. The combustion performance of the liquefied material can be further enhanced, because these [forms of petroleum] are favorably combustible. Among these, the use of paraffin is most preferred; in such a case, the combustion performance of the liquefied material can be further enhanced and the residue in the liquefied material can also be further reduced. After paraffin, light oil is the next most preferable; in the case of light oil, the residue can be reduced to a certain degree as well.

The oil is added in the sense of being a solvent for the liquefaction reaction, but is also inherently highly combustible, and therefore is advantageous in not impairing the combustion performance of the resulting liquefied material.

The following methods of production may be employed as modifications of the first, second, and third groups of aspects described above.

The first method is characterized in that a liquefied material is produced by heating a glycerin-based solid material containing glycerin into a liquefied material and thereafter mixing the liquefied material with an acid, the acid being mixed in such that the pH of the liquefied material is 3 to 12.

The second method is characterized in that a liquefied material is produced by heating a glycerin-based solid material containing glycerin into a liquefied material and thereafter mixing the liquefied material with an oxidant, the oxidant being mixed in such that the pH of the liquefied material is 3 to 12.

The third method is characterized in that a liquefied material is produced by heating a glycerin-based solid material containing glycerin into a liquefied material and thereafter mixing the liquefied material with an oxidant and an acid, the acid being mixed in such that the pH of the liquefied material is 3 to 12.

(Description Relating to the First Group of Aspects)

Illustrative examples of acids include, but are not particularly limited to, hydrochloric acid, sulfuric acid, and other inorganic acids. Preferably, an inorganic acid is used; in such a case, the liquefaction can be accelerated. Hydrochloric acid is a particularly suitable inorganic acid.

The act of mixing in the acid involves setting, for example, the amount of acid mixed or the concentration of the acid used (e.g., dilute acid or concentrated acid) such that that liquefied material reaches a pH of 3 to 12. When the pH is greater than 12 and a highly alkaline state is in effect, the liquefied material will re-solidify as time passes. Problems are also presented when the conditions are more acidic than indicated by a pH of 3, in that the tanks and other containers used for the mixing will more readily corrode. Preferably, the amount of acid mixed in or the concentration of acid used or the like is set such that the pH of the liquefied material is 4 to 11; a pH of 6 to 8 is particularly suitable.

The act of mixing preferably involves mixing such that the glycerin-based solid material content reaches 50 vol % to 90 vol % relative to the total volume of glycerin-based solid material and oil (in other words, such that the oil content reaches 10 vol % to 50 vol %), and also mixing 2 to 10 parts by volume of the acid per 100 parts by volume of the total volume of glycerin-based solid material and oil. In a case where hydrochloric acid is used as the acid, the parts by volume of hydrochloric acid mixed in are equivalent to 2 to 10 parts by volume in terms of hydrochloric acid concentrated to 35 mass %; in a case where sulfuric acid is used as the acid, the parts by volume of sulfuric acid mixed in are equivalent to 2 to 10 parts by volume in terms of hydrochloric acid concentrated to 90 mass %. Preferably, the glycerin-based solid material content is 60 vol % to 85 vol % relative to the total volume of the glycerin-based solid material and oil. Further preferably, 3 to 8 parts by volume of the acid is mixed in per 100 parts by volume of the total volume of the glycerin-based solid material and oil.

The act of mixing also preferably involves mixing the glycerin-based solid material with a mixture formed by pre-mixing the oil and acid. In such a case, efficient liquefaction is possible.

The mixed solution formed by mixing the glycerin-based solid material, the oil, and the acid may be maintained at normal temperature and liquefied, or may alternatively be heated and liquefied. The mixed solution is preferably liquefied under stirring.

(Description Relating to the Second Group of Aspects)

Examples of oxidants include, but are not particularly limited to, hydrogen peroxide, ozone, and the like. Preferably, hydrogen peroxide is used as the oxidant. In a case where hydrogen peroxide is used as the oxidant, the liquefied material can be obtained a high yield, i.e., a high-calorie liquefied material can be obtained.

The act of mixing in the oxidant involves setting, for example, the amount of oxidant mixed in or the concentration of the oxidant solution or the like such that the pH of the liquefied material is 3 to 12. When the pH is greater than 12 and is strongly alkaline, the liquefied material, having become liquefied, will re-solidify as time passes. Being more acidic than a pH of 3 is also problematic in being prone to corroding the tank and other containers used for the mixing.

Preferably, the amount of oxidant mixed in or the concentration of the oxidant solution or the like is set such that the pH of the liquefied material is 4 to 11; a pH of 6 to 8 is particularly suitable.

Preferably, the act of mixing involves mixing in 0.1 to 40 parts by volume of the oil, and a number of parts by volume of the oxidant equivalent to 0.1 to 20 parts by volume in terms of an oxidant solution concentrated to 35 mass %, per 100 parts by volume of the glycerin-based solid material. In such a case, adequate liquefaction is possible even while a high proportion of glycerin is being used.

Further, preferably, the act of mixing involves first mixing the glycerin-based solid material with the oxidant, and thereafter further mixing in the oil. In such a case, efficient liquefaction is possible.

The mixed solution formed by mixing the glycerin-based solid material, the oxidant, and the oil may be maintained at normal temperature and liquefied, or may alternatively be heated and liquefied. The mixed solution is preferably liquefied under stirring.

(Description Relating to the Third Group of Aspects)

Examples of oxidants include, but are not particularly limited to, hydrogen peroxide, ozone, and the like. Preferably, hydrogen peroxide is used as the oxidant. In a case where hydrogen peroxide is used as the oxidant, the liquefied material can be obtained a high yield, i.e., a high-calorie liquefied material can be obtained.

Illustrative examples of the acid include, but are not particularly limited to, acetic acid, formic acid, and other organic acids, or hydrochloric acid, sulfuric acid, and other inorganic acids. Preferably, acetic acid, formic acid, or another organic acid is used; such a case is advantageous in being able to lower the kinematic viscosity. Acetic acid is a particularly suitable organic acid.

The act of mixing in the acid involves setting, for example, the amount of acid mixed or the concentration of the acid used or the like such that that liquefied material reaches a pH of 3 to 12. When the pH is greater than 12 and is strongly alkaline, the liquefied material, having become liquefied, will re-solidify as time passes. Being more acidic than a pH of 3 is also problematic in being prone to corroding the tank and other containers used for the mixing. Preferably, the amount of acid mixed in or the concentration of the acid used or the like is set such that the pH of the liquefied material is 4 to 11; a pH of 6 to 8 is particularly suitable.

Preferably, the act of mixing involves mixing in 0.1 to 40 parts by volume of the oil, 0.1 to 10 parts by volume of the acid, and a number of parts by volume of the oxidant equivalent to 0.1 to 20 parts by volume in terms of an oxidant solution having a concentration of 5 mass %, per 100 parts by volume of the glycerin-based solid material. In such a case, adequate liquefaction is possible even while a high proportion of glycerin is being used.

Further, preferably, the act of mixing involves first mixing the glycerin-based solid material with the oxidant, and thereafter further mixing in the oil, and subsequently mixing in the acid. In such a case, efficient liquefaction is possible.

The mixed solution formed by mixing the glycerin-based solid material, the oxidant, the oil, and the acid may be maintained at normal temperature and liquefied, or may alternatively be heated and liquefied. The mixed solution is preferably liquefied under stirring.

(Description Relating to the First, Second, and Third Groups of Aspects)

The liquefied material obtained in the manner described above, on combustion, yields a high temperature with less fuel, and thus has excellent combustion performance. Therefore, the material can be appropriately used as, for example, a liquid fuel. The liquefied material can also be used in fuel as a mixed solution formed by mixing with petroleum (paraffin, light oil, heavy oil, and so forth) or another oil. The liquefied material can be used without modification as a liquid fuel, but may also be used as a liquid fuel once the solid components have been removed by filtration and moisture has been isolated and removed by centrifugation.

The liquefied material, when combusted, gives off less $NO_X$ (nitrogen oxide), CO (carbon monoxide), $CO_2$ (carbon dioxide), $SO_2$ (sulfur dioxide) and other emissions; and can therefore contribute to protecting the environment.

Preferably, the liquefied material obtained in the manner described above additionally undergoes the following post-treatment. Namely, the liquefied material obtained as described above is cooled to a temperature of 30° C. or lower, after which a filtrate is obtained by filtering the precipitate; subsequently, the filtrate is distilled at a distillation temperature of 150° C. to 230° C., whereby a distilled liquefied material is obtained. The coloring components and other substances in the resulting distilled liquefied material can be removed to produce a substantially colorless or colorless transparent liquefied material. The distilled liquefied material is suitable for use as, for example, a liquid fuel.

Alternatively, it is particularly preferable to perform the following post-treatment. Namely, particularly preferably, the liquefied material obtained in the manner described above is cooled to a temperature of 30° C. or lower; a filtrate is thereafter obtained by filtering out the precipitate, the filtrate being subsequently cooled to a temperature of 5° C. or lower (it is suitable to cool the filtrate to −5° C. or lower, and more suitably to −25° C. to −10° C.); and the supernatant is obtained from the cooled solution, the supernatant subsequently being distilled at a distillation temperature of 150° C. to 230° C., whereby a distilled liquefied material is obtained. The coloring components and other substances in the distilled liquefied material thus obtained can be adequately removed to produce a substantially colorless or colorless transparent liquefied material. The distilled liquefied material is suitable for use as, for example, a liquid fuel.

The precipitate can be filtered using, for example, a filter, a centrifuge, or the like. The distillation temperature is further preferably set to 160° C. to 200° C. When the distillation temperature is greater than 230° C., some of the coloring components will more readily distilled out, which is undesirable.

The methods of production described above can also be applied to a liquid glycerin-based substance containing glycerin. In such a case, it is possible to produce a liquefied material having a lower solidifying point than the solidifying point of the liquid glycerin-based substance.

Namely, a first method for producing a liquefied material of the present invention is characterized in that a liquid glycerin-based substance containing glycerin is mixed with an acid, thereby producing a liquefied material having a solidifying point that is lower than the solidifying point of the liquid glycerin-based substance; the acid being mixed in such that the pH of the liquefied material is 3 to 12.

A second method for producing a liquefied material of the present invention is characterized in that a liquid glycerin-based substance containing glycerin is mixed with an oxidant, thereby producing a liquefied material having a solidifying point that is lower than the solidifying point of the liquid glycerin-based substance; the oxidant being mixed in such that the pH of the liquefied material is 3 to 12.

A third method for producing a liquefied material of the present invention is characterized in that a liquid glycerin-based substance containing glycerin is mixed with an acid and an oxidant, thereby producing a liquefied material having a solidifying point that is lower than the solidifying point of the liquid glycerin-based substance; the acid being mixed in such that the pH of the liquefied material is 3 to 12.

The first to third methods of production described above (see Claims 27 to 29) serve to establish production methods according to the steps after the reaction steps in the first to third groups of aspects (i.e., the production methods for after the glycerin-based solid material has been made into a liquid glycerin-based substance by heating).

Namely, liquid glycerin-based substances containing glycerin which can be used are in a liquid state a normal temperature (25° C.), or are a glycerin-based solid material containing glycerin in a solid state at normal temperature (25° C.) which can be made into a liquid by being heated (a suitable heating temperature is 40° C. to 80° C.; a particularly suitable heating temperature is 40° C. to 60° C.)

WORKING EXAMPLES

The following is a description of specific working examples of the present invention, but the present invention is not particularly limited to these working examples.

Working Example 1

An esterification reaction was carried out by mixing 75 parts by mass of a plant oil obtained from Jatropha, 20 parts by mass of methanol, and 5 parts by mass of sodium hydroxide, the mixture then being held for eight hours at normal temperature under stirring, thus obtaining a product that contained a biodiesel fuel (fatty acid methyl esters and the like). The product had a biodiesel fuel content of about 75 mass %, and a glycerin-based solid material byproduct (solid material containing glycerin) content of about 25 mass %. The biodiesel fuel was separated from the product by a precipitation separation method.

Next, the glycerin-based solid material remaining from the separation (pH of about 14) was liquefied. Namely, first, 50 mL of concentrated hydrochloric acid (hydrochloric acid concentrated to 35 mass %) was pre-mixed into 300 mL of paraffin to obtain a mixture, and the mixture was mixed into 700 mL of the glycerin-based solid material, which was then stirred for 30 minutes at normal temperature, whereby a liquefied material was obtained. The resulting liquefied material had a pH of 7.

Working Example 2

The glycerin-based solid material obtained in Working Example 1 (having a pH of about 14) was liquefied by the following procedure. First, 50 mL of concentrated hydrochloric acid (hydrochloric acid concentrated to 35 mass %) was pre-mixed into 200 mL of light oil to obtain a mixture, and the mixture was mixed into 800 mL of the glycerin-based solid material, which was then stirred for 30 minutes at normal temperature, whereby a liquefied material was obtained. The resulting liquefied material had a pH of 7.

Working Example 3

The glycerin-based solid material obtained in Working Example 1 (having a pH of about 14) was liquefied by the following procedure. First, 50 mL of concentrated hydrochloric acid (hydrochloric acid concentrated to 35 mass %) was pre-mixed into 200 mL of heavy oil to obtain a mixture, and the mixture was mixed into 800 mL of the glycerin-based solid material, which was then stirred for 30 minutes at normal temperature, whereby a liquefied material was obtained. The resulting liquefied material had a pH of 7.

Working Example 4

The glycerin-based solid material obtained in Working Example 1 (having a pH of about 14) was liquefied by the following procedure. First, 20 mL of concentrated hydrochloric acid (hydrochloric acid concentrated to 35 mass %) was pre-mixed into 300 mL of paraffin to obtain a mixture, and the mixture was mixed into 700 mL of the glycerin-based solid material, which was then stirred for 30 minutes at normal temperature, whereby a liquefied material was obtained. The resulting liquefied material had a pH of 10.

Working Example 5

The glycerin-based solid material obtained in Working Example 1 (having a pH of about 14) was liquefied by the following procedure. First, 80 mL of concentrated hydrochloric acid (hydrochloric acid concentrated to 35 mass %) was pre-mixed into 300 mL of paraffin to obtain a mixture, and the mixture was mixed into 700 mL of the glycerin-based solid material, which was then stirred for 30 minutes at normal temperature, whereby a liquefied material was obtained. The resulting liquefied material had a pH of 5.

Working Example 6

The glycerin-based solid material obtained in Working Example 1 (having a pH of about 14) was liquefied by the following procedure. First, 10 mL of concentrated sulfuric acid (sulfuric acid concentrated to 90 mass %) was pre-mixed into 300 mL of paraffin to obtain a mixture, and the mixture was mixed into 700 mL of the glycerin-based solid material, which was then stirred for 30 minutes at normal temperature, whereby a liquefied material was obtained. The resulting liquefied material had a pH of 8.

Comparative Example 1

The glycerin-based solid material obtained in Working Example 1 (having a pH of about 14) was liquefied by the following procedure. First, 5 mL of concentrated hydrochloric acid (hydrochloric acid concentrated to 35 mass %) was pre-mixed into 300 mL of paraffin to obtain a mixture, and the mixture was mixed into 700 mL of the glycerin-based solid material, which was then stirred for 30 minutes at normal temperature, whereby a liquefied material was obtained. The resulting liquefied material had a pH of 13.

Working Example 8

The liquefied material obtained in Working Example 1 (pH 7; a brown, transparent liquid) was further subjected to the following post-treatment. Namely, the liquefied material obtained in Working Example 1 (a brown, transparent liquid) was cooled to 20° C. and kept at 20° C. for 1,440 minutes, after which a filtrate was obtained by the physical filtration of the precipitate present in the 20° C. liquefied material, using a filter. The filtrate was distilled at a distillation temperature of 200° C., whereby a colorless, transparent distillate (distilled liquefied material) was obtained.

TABLE 1

| | Mixture composition (parts by volume) | | | | | Resulting liquefied material | | Evaluated stability of liquid state of the liquefied materials (7 day period) |
|---|---|---|---|---|---|---|---|---|
| | Glycerin-based solid material | Oil | Concentrated Hydrochloric acid | Concentrated Sulfuric Acid | pH | Residue content | Color/ transparency | |
| Working Example 1 | 70 | Paraffin, 30 | 5 | — | 7 | ◎ | Brown, transparent | Liquid state maintained |
| Working Example 2 | 80 | Light oil, 20 | 5 | — | 7 | ○ | Brown, transparent | Liquid state maintained |
| Working Example 3 | 80 | Heavy oil, 30 | 5 | — | 7 | Δ | Brown, non-transparent | Liquid state maintained |
| Working Example 4 | 70 | Paraffin, 30 | 2 | — | 10 | ◎ | Brown, transparent | Liquid state maintained |
| Working Example 5 | 70 | Paraffin, 30 | 8 | — | 5 | ◎ | Brown, transparent | Liquid state maintained |
| Working Example 6 | 70 | Paraffin, 30 | — | 1 | 8 | ◎ | Brown, transparent | Liquid state maintained |
| Comparative Example 1 | 70 | Paraffin, 30 | 0.5 | — | 13 | ◎ | Brown, transparent | Re-solidified |
| Working Example 8 | 70 | Paraffin, 30 | 5 | — | 7 | ◎ | Colorless, transparent | Liquid state maintained |

Working Example 9

The glycerin-based solid material obtained in Working Example 1 (pH of about 14; solidifying point at 25° C.) was liquefied by the following procedure. A mixture formed by mixing 30 mL of hydrogen peroxide (water having 5 mass % hydrogen peroxide) into 700 mL of the glycerin-based solid material was stirred for 20 minutes at 60° C., after which 300 mL of paraffin was further added. After 10 minutes of stirring at 60° C., 10 mL of acetic acid (purity: 99 mass %) was further added, followed by 10 minutes of stirring at 60° C., whereby a liquefied material (pH of 7; brown, transparent liquid) was obtained.

Next, the liquefied material (a brown, transparent liquid) was cooled to 20° C. and kept at 20° C. for 30 minutes, after which a filtrate was obtained by the physical filtration of the precipitate present in the 20° C. liquefied material, using a filter. The filtrate was cooled to a temperature of −10° C. and kept at −10° C. for 180 minutes, after which the supernatant was obtained from the cooled solution, the supernatant subsequently being distilled at a distillation temperature of 200° C., whereby a colorless transparent distillate (the distilled liquefied material) was obtained. The solidifying point of the resulting distilled liquefied material was less than −30° C. (the material did not solidify at −30° C. or more).

Working Example 10

A colorless, transparent distillate (distilled liquefied material) was obtained in a manner similar with respect to Working Example 9, except in that 300 mL of heavy oil was used instead of the 300 mL of paraffin.

Working Example 11

A colorless, transparent distillate (distilled liquefied material) was obtained in a manner similar with respect to Working Example 9, except in that 300 mL of light oil was used instead of the 300 mL of paraffin.

Working Example 12

A colorless, transparent distillate (distilled liquefied material) was obtained in a manner similar with respect to Working Example 9, except in that the amount of hydrogen peroxide (water having 5 mass % hydrogen peroxide) used was set to 10 mL.

Working Example 13

A colorless, transparent distillate (distilled liquefied material) was obtained in a manner similar with respect to Working Example 9, except in that the amount of hydrogen peroxide (water having 5 mass % hydrogen peroxide) used was set to 80 mL.

Working Example 14

A colorless, transparent distillate (distilled liquefied material) was obtained in a manner similar with respect to Working Example 9, except in that the amount of acetic acid used was set to 5 mL.

Working Example 15

A colorless, transparent distillate (distilled liquefied material) was obtained in a manner similar with respect to Working Example 9, except in that the amount of acetic acid used was set to 40 mL.

Working Example 16

The glycerin-based solid material obtained in Working Example 1 (having a pH of about 14) was liquefied by the following procedure. A mixture formed by mixing 30 mL of hydrogen peroxide (water having 35 mass % hydrogen peroxide) into 700 mL of the glycerin-based solid material was stirred for 10 minutes at 60° C., after which 300 mL of paraffin was further added, followed by 10 minutes of stirring at 60° C., whereby a liquefied material (pH of 7; brown, transparent liquid) was obtained.

Next, the liquefied material (a brown, transparent liquid) was cooled to 20° C. and kept at 20° C. for 60 minutes, after which a filtrate was obtained by the physical filtration of the precipitate present in the 20° C. liquefied material, using a filter; subsequently, the filtrate was cooled to a temperature of −10° C. and kept at −10° C. for 1,440 minutes, after which the supernatant was obtained from the cooled solution, the supernatant subsequently being distilled at a distillation temperature of 200° C., whereby a colorless transparent distillate (the distilled liquefied material) was obtained.

Working Example 17

A colorless, transparent distillate (distilled liquefied material) was obtained in a manner similar with respect to Working Example 16, except in that 300 mL of heavy oil was used instead of the 300 mL of paraffin.

Working Example 18

A colorless, transparent distillate (distilled liquefied material) was obtained in a manner similar with respect to Working Example 16, except in that 300 mL of light oil was used instead of the 300 mL of paraffin.

Working Example 19

A colorless, transparent distillate (distilled liquefied material) was obtained in a manner similar with respect to Working Example 16, except in that the amount of hydrogen peroxide (water having 35 mass % hydrogen peroxide) used was set to 10 mL.

Working Example 20

A colorless, transparent distillate (distilled liquefied material) was obtained in a manner similar with respect to Working Example 16, except in that the amount of hydrogen peroxide (water having 35 mass % hydrogen peroxide) used was set to 70 mL.

Working Example 21

The glycerin-based solid material obtained in Working Example 1 (pH of about 14; solidifying point at 25° C.) was liquefied by the following procedure. A mixture formed by heating 700 mL of the glycerin-based solid material to 60° C. to make a liquid material and thereafter mixing 10 mL of hydrogen peroxide (5 mass % of aqueous hydrogen peroxide) into the liquid material was stirred for 20 minutes at 60° C., after which 20 mL of acetic acid (purity: 99 mass %) was further added, followed by 10 minutes of stirring at 60° C., whereby a liquefied material (pH of 5; brown, transparent liquid) was obtained.

Next, the liquefied material (a brown, transparent liquid) was cooled to 20° C. and kept at 20° C. for 30 minutes, after which a filtrate was obtained by the physical filtration of the precipitate present in the 20° C. liquefied material, using a filter; subsequently, the filtrate was cooled to a temperature of −10° C. and kept at −10° C. for 180 minutes, after which the supernatant was obtained from the cooled solution, the supernatant subsequently being distilled at a distillation temperature of 200° C., whereby a colorless transparent distillate (the distilled liquefied material) was obtained. The solidifying point of the resulting distilled liquefied material was less than −30° C. (the material did not solidify at −30° C. or more).

Working Example 22

A mixture formed by mixing 10 mL of hydrogen peroxide (water having 5 mass % hydrogen peroxide) into 700 mL of a liquid glycerin-based substance (having a solidifying point of −5° C.) was stirred for 20 minutes at 60° C., after which 300 mL of paraffin was added, and stirring was performed for 10 minutes at 60° C. 20 mL of acetic acid (purity: 99 mass %) was further added, followed by 10 minutes of stirring at 60° C., whereby a liquefied material (pH of 5; brown, transparent liquid) was obtained.

Next, the liquefied material (a brown, transparent liquid) was cooled to 20° C. and kept at 20° C. for 30 minutes, after which a filtrate was obtained by the physical filtration of the precipitate present in the 20° C. liquefied material, using a filter. The filtrate was cooled to a temperature of −10° C. and kept at −10° C. for 180 minutes, after which the supernatant was obtained from the cooled solution, the supernatant subsequently being distilled at a distillation temperature of 200° C., whereby a colorless transparent distillate (the distilled liquefied material) was obtained. The solidifying point of the resulting distilled liquefied material was less than −30° C. (the material did not solidify at −30° C. or more).

TABLE 2

| | Mixture composition (parts by volume) | | | | | Resulting liquefied materials | | Evaluated stability of liquid state of the liquefied materials (7 day period) |
|---|---|---|---|---|---|---|---|---|
| | Glycerin-based solid material | Hydrogen peroxide | Oil | Acetic acid | pH | Residue content | Color/transparency | |
| Working Example 9 | 70 | 3 | Paraffin, 30 | 1 | 5 | ⊚ | Colorless, transparent | Liquid state maintained |
| Working Example 10 | 70 | 3 | Heavy oil, 30 | 1 | 5 | ⊚ | Colorless, transparent | Liquid state maintained |
| Working Example 11 | 70 | 3 | Light oil, 30 | 1 | 5 | ⊚ | Colorless, transparent | Liquid state maintained |
| Working Example 12 | 70 | 1 | Paraffin, 30 | 1 | 7 | ⊚ | Colorless, transparent | Liquid state maintained |
| Working Example 13 | 70 | 8 | Paraffin, 30 | 1 | 7 | ⊚ | Colorless, transparent | Liquid state maintained |
| Working Example 14 | 70 | 3 | Paraffin, 30 | 0.5 | 8 | ⊚ | Colorless, transparent | Liquid state maintained |
| Working Example 15 | 70 | 3 | Paraffin, 30 | 4 | 5 | ⊚ | Colorless, transparent | Liquid state maintained |
| Working Example 16 | 70 | 3 | Paraffin, 30 | — | 7 | ⊚ | Colorless, transparent | Liquid state maintained |
| Working Example 17 | 70 | 3 | Heavy oil, 30 | — | 7 | ⊚ | Colorless, transparent | Liquid state maintained |
| Working Example 18 | 70 | 3 | Light oil, 30 | — | 7 | ⊚ | Colorless, transparent | Liquid state maintained |

TABLE 2-continued

| | Mixture composition (parts by volume) | | | | | Resulting liquefied materials | | Evaluated stability of liquid state of the liquefied materials (7 day period) |
|---|---|---|---|---|---|---|---|---|
| | Glycerin-based solid material | Hydrogen peroxide | Oil | Acetic acid | pH | Residue content | Color/ transparency | |
| Working Example 19 | 70 | 1 | Paraffin, 30 | — | 7 | ◎ | Colorless, transparent | Liquid state maintained |
| Working Example 20 | 70 | 7 | Paraffin, 30 | — | 6 | ◎ | Colorless, transparent | Liquid state maintained |
| Working Example 21 | 70 | 1 | — | 2 | 5 | ◎ | Colorless, transparent | Liquid state maintained |
| Working Example 22 | 70 liquid material | 1 | Paraffin, 30 | 2 | 5 | ◎ | Colorless, transparent | Liquid state maintained |

The following testing methods were used to evaluate the stability of the liquid state of each of the liquefied materials obtained as described above, as well as the approximate residue content of the liquefied materials and the color and transparency of the liquefied materials.

<Method for Evaluating the Stability of the Liquid State of the Liquefied Materials>

1,000 mL of the resulting liquefied materials was allowed to stand for seven days under conditions of about 25° C., after which the liquid state thereof was visually observed. Tables 1 and 2 show the observation results.

<Method for Evaluating the Approximate Residue Content in the Liquefied Materials>

The resulting liquefied materials were visually observed and the approximate content of residue in the liquefied materials was evaluated on the basis of the following criteria. Tables 1 and 2 show the evaluation results.
(Criteria)
◎ . . . Very little residue content in the liquefied material
○ . . . Some residue content in the liquefied material
Δ . . . High residue content in the liquefied material
x . . . Very high residue content in the liquefied material <Method for Evaluating the Color and Transparency of the Liquefied Materials>

The resulting liquefied materials were visually observed to evaluate the color of the liquefied materials, and to evaluate the transparency of the liquefied materials on the basis of the following criteria. Tables 1 and 2 show the evaluation results.
(Criteria)
{Transparent} . . . The liquefied material has excellent transparency.
{Semitransparent} . . . The liquefied material, though transparent, is not highly transparent.
{Not transparent} . . . The liquefied material is not transparent.

As is apparent from Table 1, the liquefied materials of Working Examples 1 to 6 and 8 to 21, which were obtained by the method of production of the present invention, had long-term stability and maintained a liquid state. By contrast, Comparative Example 1, which re-solidified as time passed, was not readily used as, for example, a fuel, and was not commercially viable.

Next, the combustion performance of the liquefied material obtained in Working Example 1 was evaluated. The liquefied material obtained in Working Example 1 was placed in a boiler and the combustion performance was evaluated. As a reference example, combustion performance was similarly evaluated with regard to A-heavy oil. Combustion performance was similarly evaluated with regard to a mixed solution (Working Example 7) formed by mixing 50 parts by volume of A-heavy oil in 50 parts by volume of the liquefied material of Working Example 1. Table 3 shows the results of the evaluations.

As is apparent from Table 3, the liquefied material of Working Example 1 obtained by the method of production of the present invention results in a higher temperature with less fuel used than the A-heavy oil of the reference example, and has excellent combustion performance. Further, the liquefied material of Working Example 1, when combusted, gives off less $NO_X$ (nitrogen oxide), CO (carbon monoxide), $CO_2$ (carbon dioxide), $SO_2$ (sulfur dioxide) and other emissions than the A-heavy oil of the reference example, and can therefore contribute to protecting the environment.

The mixture of Working Example 7 also results in a higher temperature with less fuel used compared to the A-heavy oil of the reference example, and has excellent combustion performance. Further, the mixture solution of Working Example 7, when combusted, gives off less $NO_x$ (nitrogen oxide), CO (carbon monoxide), $CO_2$ (carbon dioxide), $SO_2$ (sulfur dioxide) and other emissions than the A-heavy oil of the reference example, and can therefore contribute to protecting the environment.

TABLE 3

| | | Reference Example | Working Example 1 | Working Example 7 |
|---|---|---|---|---|
| Sample (vol %) | Liquefied material of Working Example 1 | — | 100 | 50 |
| | A-heavy oil | 100 | — | 50 |
| Combustion performance items | Amount of fuel (L/hr) | 7 | 6.7 | 6.7 |
| | Flue outlet temperature (° C.) | 824 | 854 | 874 |
| | $NO_x$ (ppm) | 36 | 26 | 24 |
| | CO (ppm) | 7.6 | 4.0 | 3.8 |
| | $CO_2$ (%) | 6.2 | 4.5 | 4.2 |
| | $O_2$ (%) | 13.6 | 14.8 | 15.2 |
| | $SO_2$ (ppm) | 4.0 | 0 | 0 |
| | Primary air amount ($m^3$/hr) | 27 | 27 | 27 |
| | Secondary air amount ($m^3$/hr) | 68 | 68 | 68 |

Table 4 shows the results from the analysis of the liquefied material obtained in Working Example 1. Table 5 shows the results from the analysis of the liquefied material obtained in Working Example 4. Table 6 shows the results from the analysis of the liquefied material obtained in Working Example 5. Table 7 shows the results from the analysis of the liquefied material (distilled liquefied material) obtained in Working Example 9. Table 8 shows the results from the analysis of the liquefied material (distilled liquefied material) obtained in Working Example 10. Table 9 shows the results from the analysis of the liquefied material (distilled liquefied material) obtained in Working Example 16.

The liquefied material obtained in Working Example 21 had a gross calorific value of about 23,500 J/g.

TABLE 4

| Item | Liquefied material of Working Example 1 | Testing method |
|---|---|---|
| Reaction*[1] | Not measurable | JIS K2252 |
| Ignition point (° C.)*[2] | 30.0 (reference value) | JIS K2265-3 |
| Kinematic viscosity (50° C.) (mm$^2$/s) | 6.91 | JIS K2283 |
| Pour point (° C.) | −20.0 | JIS K2269 |
| Residual carbon (mass %) | 2.00 | JIS K2270 |
| Moisture (vol %) | 2.2 | JIS K2275 |
| Ash (mass %) | 1.05 | JIS K2272 |
| Sulfur (mass %) | 0.01 | JIS K2541-3 |
| Gross calorific value (J/g) | 40100 | JIS K2279 |

*[1] The aqueous layer portion in the reaction test exhibited a dark brown color and was marked as "Not measurable"
*[2] Deviates from the range "Liquid flammable at greater than 40° C." used in the JIS K2265 and so was marked as "Reference Value"

TABLE 5

| Item | Liquefied material of Working Example 4 | Testing method |
|---|---|---|
| Reaction*[1] | Not measurable | JIS K2252 |
| Ignition point (° C.)*[2] | 30.0 (reference value) | JIS K2265-3 |
| Kinematic viscosity (50° C.) (mm$^2$/s) | 6.91 | JIS K2283 |
| Pour point (° C.) | −20.0 | JIS K2269 |
| Residual carbon (mass %) | 2.00 | JIS K2270 |
| Moisture (vol %) | 2.2 | JIS K2275 |
| Ash (mass %) | 1.05 | JIS K2272 |
| Sulfur (mass %) | 0.01 | JIS K2541-3 |
| Gross calorific value (J/g) | 40100 | JIS K2279 |

*[1] The aqueous layer portion in the reaction test exhibited a dark brown color and was marked as "Not measurable"
*[2] Deviates from the range "Liquid flammable at greater than 40° C." used in the JIS K2265 and so was marked as "Reference Value"

TABLE 6

| Item | Liquefied material of Working Example 5 | Testing method |
|---|---|---|
| Reaction*[1] | Not measurable | JIS K2252 |
| Ignition point (° C.)*[2] | 30.0 (reference value) | JIS K2265-3 |
| Kinematic viscosity (50° C.) (mm$^2$/s) | 4.62 | JIS K2283 |
| Pour point (° C.) | −25.0 | JIS K2269 |
| Residual carbon (mass %) | 0.79 | JIS K2270 |
| Moisture (vol %) | 2.0 | JIS K2275 |
| Ash (mass %) | 0.50 | JIS K2272 |
| Sulfur (mass %) | 0.02 | JIS K2541-3 |
| Gross calorific value (J/g) | 41230 | JIS K2279 |

*[1] The aqueous layer portion in the reaction test exhibited a dark brown color and was marked as "Not measurable"
*[2] Deviates from the range "Liquid flammable at greater than 40° C." used in the JIS K2265 and so was marked as "Reference Value"

TABLE 7

| Item | Liquefied material of Working Example 9 | Testing method |
|---|---|---|
| Reaction | Acidic | JIS K2252 |
| Ignition point (° C.)*[2] | 36.0 (reference value) | JIS K2265-3 |
| Kinematic viscosity (50° C.) (mm$^2$/s) | 0.987 | JIS K2283 |
| Pour point (° C.) | −30.0 | JIS K2269 |
| Residual carbon (mass %) | 0.01 | JIS K2270 |
| Moisture (vol %) | 0.02 | JIS K2275 |

TABLE 7-continued

| Item | Liquefied material of Working Example 9 | Testing method |
|---|---|---|
| Ash (mass %) | less than 0.001 | JIS K2272 |
| Sulfur (mass %) | 0.0012 | JIS K2541-3 |
| Gross calorific value (J/g) | 45500 | JIS K2279 |

*[2] Deviates from the range "Liquid flammable at greater than 40° C." used in the JIS K2265 and so was marked as "Reference Value"

TABLE 8

| Item | Liquefied material of Working Example 10 | Testing method |
|---|---|---|
| Reaction | Acidic | JIS K2252 |
| Ignition point (° C.)*[2] | 36.0 (reference value) | JIS K2265-3 |
| Kinematic viscosity (50° C.) (mm$^2$/s) | 1.623 | JIS K2283 |
| Pour point (° C.) | −25.0 | JIS K2269 |
| Residual carbon (mass %) | 0.03 | JIS K2270 |
| Moisture (vol %) | 0.03 | JIS K2275 |
| Ash (mass %) | 0.001 | JIS K2272 |
| Sulfur (mass %) | 0.042 | JIS K2541-3 |
| Gross calorific value (J/g) | 44850 | JIS K2279 |

*[2] Deviates from the range "Liquid flammable at greater than 40° C." used in the JIS K2265 and so was marked as "Reference Value"

TABLE 9

| Item | Liquefied material of Working Example 16 | Testing method |
|---|---|---|
| Reaction | Alkaline | JIS K2252 |
| Ignition point (° C.) | 61.0 | JIS K2265-3 |
| Kinematic viscosity (50° C.) (mm$^2$/s) | 1.825 | JIS K2283 |
| Pour point (° C.) | −17.5 | JIS K2269 |
| Residual carbon (mass %) | 0.10 | JIS K2270 |
| Moisture (vol %) | 0.05 | JIS K2275 |
| Ash (mass %) | 0.024 | JIS K2272 |
| Sulfur (mass %) | 0.01 | JIS K2541-3 |
| Gross calorific value (J/g) | 43610 | JIS K2279 |

The present application claims the priority of Japanese Patent Application No. 2009-199944, filed on Aug. 31, 2009, the matter disclosed therein constituting a part of the present application verbatim.

The liquefied material produced by the method of production of the present invention has excellent combustion performance and is therefore suitable for use as, for example, a liquid fuel, but is not particularly limited to such applications.

The invention claimed is:

1. A method for producing a liquefied material from a glycerin-based solid material, wherein a liquefied material is produced by mixing: a glycerin-based solid material containing glycerin;
    at least one oil selected from the group consisting of a mineral oil, an animal oil, and a plant oil;
    and an acid; the acid being mixed in such that the pH of the liquefied material is 3 to 12.

2. A method for producing a liquefied material from a glycerin-based solid material, wherein a liquefied material is produced by mixing: a glycerin-based solid material formed as a byproduct when a biodiesel fuel is produced from a plant oil;
    at least one oil selected from the group consisting of a mineral oil, an animal oil, and a plant oil;
    and an acid; the acid being mixed in such that the pH of the liquefied material is 3 to 12.

3. The method for producing a liquefied material from a glycerin-based solid material according to claim 1, wherein when the components are mixed, a mixture formed by mixing the oil and the acid is mixed with the glycerin-based solid material.

4. The method for producing a liquefied material from a glycerin-based solid material according to claim 1, wherein when the components are to be mixed, mixing is performed such that the glycerin-based solid material content relative to the total volume of glycerin-based solid material and oil is 50 vol % to 90 vol %, and 2 to 10 parts by volume of the acid is mixed per 100 parts by volume of the total of the glycerin-based solid material and oil.

5. A method for producing a liquefied material from a glycerin-based solid material, wherein a liquefied material is produced by mixing a glycerin-based solid material containing glycerin with an acid; and the acid is mixed in such that the pH of the liquefied material is 3 to 12.

6. The method for producing a liquefied material from a glycerin-based solid material according to claim 1, wherein an inorganic acid is used as the acid.

7. The method for producing a liquefied material from a glycerin-based solid material according to claim 6, wherein the inorganic acid is hydrochloric acid.

8. A method for producing a liquefied material from a glycerin-based solid material, wherein a liquefied material is produced by mixing: a glycerin-based solid material containing glycerin;
an oxidant;
and at least one oil selected from the group consisting of a mineral oil, an animal oil, and a plant oil; the oxidant being mixed in such that the pH of the liquefied material is 3 to 12.

9. A method for producing a liquefied material from a glycerin-based solid material, wherein a liquefied material is produced by mixing: a glycerin-based solid material formed as a byproduct when a biodiesel fuel is produced from a plant oil;
an oxidant;
and at least one oil selected from the group consisting of a mineral oil, an animal oil, and a plant oil; the oxidant being mixed in such that the pH of the liquefied material is 3 to 12.

10. The method for producing a liquefied material from a glycerin-based solid material according to claim 8, wherein when the components are to be mixed, the glycerin-based solid material and the oxidant are mixed first, and the oil is mixed in thereafter.

11. The method for producing a liquefied material from a glycerin-based solid material according to claim 8, wherein when the components are to be mixed, 0.1 to 40 parts by volume of the oil and 0.1 to 20 parts by volume of the oxidant, in terms of an oxidant solution having a concentration of 35 mass %, are mixed per 100 parts by volume of the glycerin-based solid material.

12. A method for producing a liquefied material from a glycerin-based solid material, wherein a liquefied material is produced by mixing a glycerin-based solid material containing glycerin with an oxidant; the oxidant being mixed in such that the pH of the liquefied material is 3 to 12.

13. The method for producing a liquefied material from a glycerin-based solid material according to claim 8, wherein hydrogen peroxide is used as the oxidant.

14. A method for producing a liquefied material from a glycerin-based solid material, wherein a liquefied material is produced by mixing: a glycerin-based solid material containing glycerin;
an oxidant;
at least one oil selected from the group consisting of a mineral oil, an animal oil, and a plant oil;
and an acid; the acid being mixed in such that the pH of the liquefied material is 3 to 12.

15. A method for producing a liquefied material from a glycerin-based solid material, wherein a liquefied material is produced by mixing: a glycerin-based solid material formed as a byproduct when a biodiesel fuel is produced from a plant oil;
an oxidant;
at least one oil selected from the group consisting of a mineral oil, an animal oil, and a plant oil;
and an acid; the acid being mixed in such that the pH of the liquefied material is 3 to 12.

16. The method for producing a liquefied material from a glycerin-based solid material according to claim 14, wherein when the components are to be mixed, the glycerin-based solid material and the oxidant are mixed first, whereupon the oil is then mixed in, after which the acid is mixed in.

17. The method for producing a liquefied material from a glycerin-based solid material according to claim 14, wherein when the components are to be mixed, 0.1 to 40 parts by volume of the oil, 0.1 to 10 parts by volume of the acid, and 0.1 to 20 parts by volume of the oxidant, in terms of an oxidant solution having a concentration of 5 mass %, per 100 parts by volume of the glycerin-based solid material.

18. A method for producing a liquefied material from a glycerin-based solid material, wherein a liquefied material is produced by mixing: a glycerin-based solid material containing glycerin, an oxidant, and an acid; the acid being mixed in such that the pH of the liquefied material is 3 to 12.

19. The method for producing a liquefied material from a glycerin-based solid material according to claim 14, wherein hydrogen peroxide is used as the oxidant.

20. The method for producing a liquefied material from a glycerin-based solid material according to claim 14, wherein acetic acid is used as the acid.

21. The method for producing a liquefied material from a glycerin-based solid material according to claim 14, wherein the acid is mixed in such that the pH of the liquefied material is 4 to 11.

22. The method for producing a liquefied material from a glycerin-based solid material according to claim 1, wherein petroleum is used as the oil.

23. The method for producing a liquefied material from a glycerin-based solid material according to claim 22, wherein the petroleum is one, two or more types of petroleum selected from the group consisting of paraffin, light oil, and heavy oil.

24. The method for producing a liquefied material from a glycerin-based solid material according to claim 22, wherein the petroleum is paraffin.

25. The method for producing a liquefied material from a glycerin-based solid material according to claim 1, wherein the liquefied material obtained by the mixing is cooled to a temperature of 30° C. or lower, a precipitate is subsequently filtered, whereby a filtrate is obtained; and the filtrate is subsequently distilled at a distillation temperature of 150 to 230° C.

26. The method for producing a liquefied material from a glycerin-based solid material according to claim 1, wherein the liquefied material obtained by the mixing is cooled to a temperature of 30° C. or lower, a precipitate is subsequently filtered, whereby a filtrate is obtained, the filtrate is cooled to a temperature of 5° C. or lower; a supernatant is obtained from the cooled liquid; and the supernatant is subsequently distilled at a distillation temperature of 150 to 230° C.

27. A method for producing a liquefied material, wherein a liquid glycerin-based substance containing glycerin is mixed with an acid, thereby producing a liquefied material having a solidifying point that is lower than the solidifying point of the liquid glycerin-based substance; the acid being mixed in such that the pH of the liquefied material is 3 to 12.

28. A method for producing a liquefied material, wherein a liquid glycerin-based substance containing glycerin is mixed with an oxidant, thereby producing a liquefied material having a solidifying point that is lower than the solidifying point of the liquid glycerin-based substance; the oxidant being mixed in such that the pH of the liquefied material is 3 to 12.

29. A method for producing a liquefied material, wherein a liquid glycerin-based substance containing glycerin is mixed with an acid and an oxidant, thereby producing a liquefied material having a solidifying point that is lower than the solidifying point of the liquid glycerin-based substance; the acid being mixed in such that the pH of the liquefied material is 3 to 12.

30. A liquefied material for fuel produced by the production method according to claim 1.

* * * * *